United States Patent Office 3,289,775
Patented Dec. 6, 1966

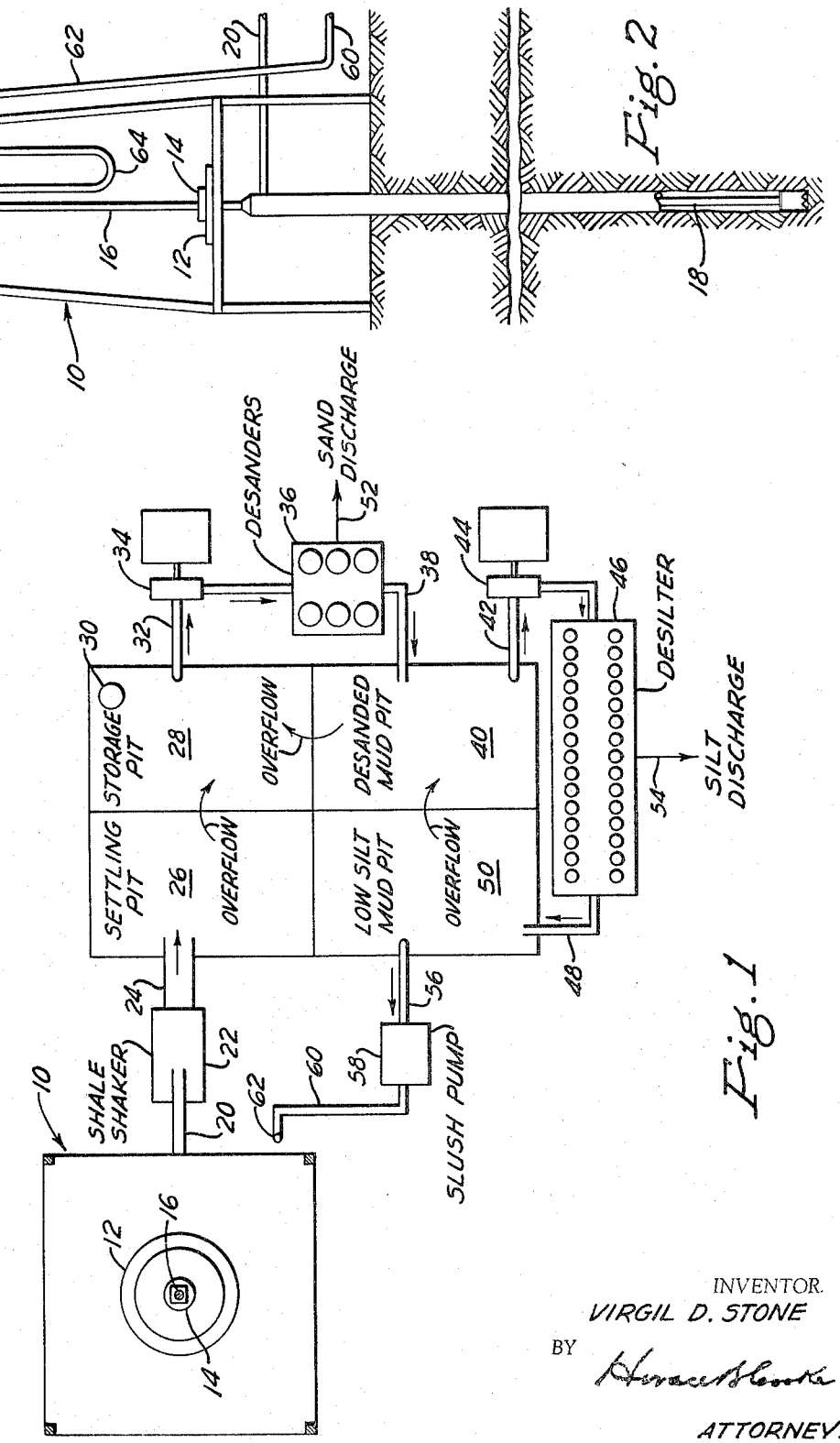

3,289,775
APPARATUS AND METHOD FOR TREATING DRILLING MUD
Virgil D. Stone, Morgan City, La., assignor to Gulf Oil Corporation, Pittsburgh, Pa., a corporation of Pennsylvania
Filed July 24, 1963, Ser. No. 297,431
15 Claims. (Cl. 175—66)

This invention relates to the drilling of wells, and more particularly to the treatment of drilling muds used in the drilling of wells by the rotary drilling process.

In the rotary drilling process, a drilling mud is pumped down through rotating drill pipe and out through orifices in a drill bit at the lower end of the drill pipe. The drilling mud is then forced upwardly through the annulus between the borehole wall and the outer surface of the drill pipe to the surface. One of the most important functions of the drilling mud is to carry cuttings created by the drill bit from the borehole. The cuttings are separated from the drilling mud at the wellhead before the drilling mud is recirculated through the well. Ordinarily drilling muds contain finely divided clay solids which increase the viscosity of the drilling mud, and thereby aid in the removal of the cuttings from the borehole. The clay solids may have other important effects such as forming a filter cake of low permeability on the borehole wall to prevent loss of fluid from the drilling mud into formations penetrated by the well.

Large cuttings discharged from a well with the drilling mud are usually separated from the liquid in the drilling mud by passing the mud through a screen, ordinarily referred to as a "shale shaker." The liquid portion of the mud and fine solid particles pass through the screen and are delivered to apparatus for further treatment of the drilling mud and recirculation of treated drilling mud through the well. It is a common practice to remove from the drilling mud before recirculating the drilling mud through the well most of the particles, generally referred to as sand, of an intermediate size smaller than the cuttings separated by the shale shaker but larger than the clay solids. Ordinarily, advantages in drilling as a result of reducing the sand concentration have been fully appreciated or understood; consequently, well owner have not been concerned with sand removal. Sand removal has been promoted principally by drilling contractors to reduce abrasive wear of their mud handling equipment. Sand is described in "Composition and Properties of Oil Well Drilling Fluids," by Rogers, published by Gulf Publishing Company, Houston, Texas, as being usually coarser than 100 mesh. Sand particles may be finer than 100 mesh, and the API test for sand is a measure of solid particles that are retained on a 200 mesh screen.

Sand removal has been accomplished by circulating a portion of the drilling mud stream through cyclone separators, usually referred to as "desanders," to divide that portion of the drilling mud into a fluid having a low sand concentration which is returned to the system, and a stream of sand particles which is discarded from the system. The usual desanding of drilling muds results in reduction of sand concentration in the drilling mud recirculated to the well to approximately 1½ to 3 percent, but is largely ineffective in removing smaller particles, such as particles having a size in the range of approximately 10 to 77 microns, referred to as "silt."

Difficulties in drilling frequently increase at depths below 8,000 feet, and become especially troublesome at depth below 10,000 feet. Often the hardness of the subsurface formations increases as the depth of the well increases. As the depth of the well is increased, it is necessary to increase the viscosity of the drilling mud to insure removal of cuttings from the hole by the upwardly flowing stream of drilling mud. Clay solids are incorporated in the drilling mud to increase the viscosity of the drilling mud to a level effective to remove the cuttings. An important cause of loss of drilling time below 8,000 feet is stuck drill pipe which is frequently the result of encountering high pressure salt water flows during the drilling. Although stuck drill pipe does occur at shallow depths, it is more common in deep wells. It is believed that an important cause of stuck pipe in deep wells when high pressure salt water flows are encountered is washing filter cake from the borehole wall and thereby increasing the volume of solids in the borehole.

This invention resides in a method and apparatus for treating a drilling mud containing clay solids used in a rotary drilling process to strip solids down to a median cut of 10 to 20 microns from the drilling mud to form a novel "low silt" drilling mud containing clay solids in concentrations to impart desirable viscosity characteristics to the drilling mud. The stripping of solid particles from the drilling muds in accordance with this invention results in a low silt drilling mud containing clay solids, but from which a very high percentage of silt particles having a size larger than 30 microns and all sand measurable by the API test for sand have been removed. Only the low silt drilling mud is delivered to the slush pump for circulation through the well.

Separation of the sand and silt particles from the drilling mud is accomplished by passing all of the drilling mud, before delivery to the slush pump for circulation in the well, through desilters at a total rate exceeding the rate of circulation in the well to remove silt particles from the mud. In particular, the desilting is accomplished by circulating drilling mud from a desanded drilling mud storage pit through desilters into a low silt drilling mud storage pit, and circulating the drilling mud from the low silt drilling mud storage pit through the mud system of a rotary drilling process. The rate of passing the desanded mud through the desilters and into the low silt drilling mud pit is preferably 150 to 200 percent of the rate of circulation through the well. The resultant overflow from the low silt drilling mud pit flows into the desanded drilling mud pit for recirculation through the desilting apparatus.

FIGURE 1 of the drawings is a diagrammatic illustration in horizontal cross section through a drilling rig above the rotating table showing the mud handling apparatus in plan view; and FIGURE 2 is a diagrammatic view in elevation of a portion of the drilling rig illustrated in FIGURE 1.

Referring to the drawings, a drilling rig, indicated generally by reference numeral 10, is illustrated having a rotary table 12 driven by suitable power means, not shown, to turn a kelly bushing 14. Passing through the kelly bushing 14 is a kelly 16 which is connected to the upper end of drill pipe 18, illustrated in FIGURE 2, for the circulation of drilling mud down the well. Drilling mud returned through the annulus of the well is delivered through a mud return line 20 to a shale shaker 22 in which coarse cuttings are separated from the liquid and fine solid particles in the drilling mud.

The drilling mud passing through the screen of the shale shaker is delivered through a flume 24 into a settling pit 26 in which the coarser particles passing through the shale shaker settle from the drilling mud. The drilling mud overflows from settling pit 26 into a drilling mud storage pit 28 in which further settling of the coarse solid particles from the drilling mud occurs. A level recorder 30 in storage pit 28 keeps a record of the level of the drilling mud in the pit to indicate loss of circulation or flows of liquid into the well.

Drilling mud is picked up from the storage pit 28 through a desander pump suction line 32 and delivered by a desander pump 34 to a bank of desanders 36. Desanders 36 separate sand from the drilling mud and deliver the desanded drilling mud through line 38 into a desanded mud pit 40.

Desanded mud is picked up by a desilter pump suction line 42 and delivered by a desilter pump 44 to a bank of desilters 46. Mud is discharged from desilters 46 through line 48 into a low silt mud pit 50. Sand is discharged from the system through line 52 from the bank of desilters 36 and silt is discharged from the system through line 54 from the bank of desilters 46. Drilling mud delivered to low silt mud pit 50 in excess of the rate of circulation through the well overflows from the low silt mud pit 50 into desanded mud pit 40 and is again circulated through the desilters, thereby making removal of silt particles more complete.

The desilted mud from pit 50 is picked up by the suction line 56 of the slush pump 58 used for circulating drilling mud through the rotary drilling system. Drilling mud discharged from slush pump 58 passes through mud line 60 into the lower end of mud stand pipe 62 which is connected at its upper end to a flexible mud hose 64. The mud hose 64 is connected to a swivel, not shown, from which the kelly 16 is suspended, and is delivered through the swivel into the upper end of the kelly.

The individual desanders 36 are cyclone separators of conventional design ordinarily having a nominal size of 6 or 8 inches. Such cyclone separators are effective in removing sand, but not silt, from the mud. Thus the desanders 36 will strip solid particles larger than 200 mesh from the drilling mud and deliver to the desanded mud pit 40 a drilling mud substantially devoid of particles larger than 200 mesh. Because 100 percent of the mud circulated through the mud system must pass through the desanders, the desanders 36 must have a total drilling mud throughput capacity at least as high as the rate of circulating drilling mud down the well. It is necessary in order to provide adequate flow capacity through the desanders of the cyclone separator type now available, to supply a plurality of desanders 36 connected in parallel. The number of desanders will depend upon the mud circulating rate of the drilling rig and the capacity of the individual desanders, which in turn will depend upon whether the desanders are 6 inch, 8 inch, or perhaps larger, cyclone separators. Ordinarily 4 to 10 desanders are adequate. In a preferred arrangement, the desanders 36 have a total capacity exceeding the mud circulating rate. In such preferred arrangement, provision is made for overflow from the desanded mud pit 40 to return to the storage pit 28 for recirculation through the desanders.

The individual desilters 46 are also conventional cyclone separators but are of a nominal 3 to 4 inch size. Such cyclone separators are capable of removal of any measurable amounts of sand which might have been delivered into the desanded mud pit 40, and substantially all of the silt particles having a size larger than 30 microns diameter to deliver to the low silt mud pit a drilling mud in which the median cut of solid particles is 10 to 20 microns. The desilters should remove at least 85 percent, preferably more than 90 percent, and still more desirably at least 95 percent of the solid particles having an equivalent diameter of 30 microns or more. Three inch cyclone separators are particularly desirable for use with drilling muds weighted with barite or iron oxide because they separate the silt particles from the barite particles to deliver low silt drilling mud containing much of the desired weighting agent into the low silt mud pit 50.

Desilters 46, like desanders 36, are connected in parallel to provide a total flow capacity exceeding the mud circulating rate of the mud system. It is especially desirable that the capacity of the desilters be adequate to allow a total rate of flow through the desilters 150 to 200 percent of the mud circulating rate to cause the drilling mud to make more than one pass through the desilters. Because some drilling rigs circulate mud at rates of 1200 gallons per minute and more, a large number of 3 to 4 inch cyclone separators are required to provide the necessary flow capacity of at least 100 percent of the mud circulating rate and preferably 150 to 200 percent of the mud circulating rate. If 4 inch cyclone separators are used, it will ordinarily be necessary to provide 12 to 60 cyclone separators connected in parallel to provide the desired flow capacity through the desilters. The total number of desilters will depend upon the capacity of the mud circulating system and the maximum throughput of the individual desilters.

It is apparent from the large number of cyclone separators required that the treatment of the mud by the process of this invention is not similar to the conventional treatment of drilling mud in either cyclone separators or centrifuges to remove solid particles from the drilling mud. Because of the low flow capacity of the cyclone separators and centrifuges capable of removing fine sands from drilling mud, it has been the practice to pass through the desanding apparatus from a portion of the mud circulating through the system. Centrifuges for treating drilling muds, for example, ordinarily have a flow capacity of the order of 30 gallons per minute. In a system in which drilling mud is circulated through the well at 1,200 gallons per minute, only about one-fortieth of the drilling mud circulated could be treated by a single centrifuge in a single pass through the system.

The process of this invention can be used for the treatment of drilling muds in which the liquid phase is water, oil, or an emulsion of oil and water. The oil used to form at least a part of the liquid phase of the drilling mud is usually a mineral oil. Diesel oil is especially suitable and is widely used. This invention is particularly advantageous in the treatment of unweighted drilling muds having densities up to 10½ pounds per gallon and containing up to about 12 percent clay solids. The clay solids may be either native clays incorporated in the drilling mud in the drilling process or clays added to the drilling mud to increase the viscosity of the drilling mud to the range of 28 to 50 seconds by the Marsh funnel test. Clay solids in the drilling mud have a particle size up to approximately 2 microns and not exceeding about 10 microns. Larger solid particles in the drilling mud are considered to be silt. It has also been found that this invention is useful in the treatment of drilling muds weighted with barite and iron oxide and permits the stripping of silt particles from the drilling mud while retaining weighting agent in the drilling mud.

Comparisons for wall building properties of drilling mud treated in accordance with this invention with ordinary desanded drilling muds show that the low silt drilling muds form a thinner, tougher, more adherent and slippery filter cake which aids in avoiding stuck drill pipe during drilling operations. When the drilling mud contains normal amounts of silt, a bulky and gritty wall cake is formed. Difficulties with stuck drill pipe are common after high pressure salt water flows are encountered. It is believed that one of the principal causes of the stuck drill pipe is the washing loose of wall cake by the presence of salt water, thereby increasing the total solids suspended in the borehole. The thinner wall cake formed when low silt muds are used and the smaller particles comprising the wall cake, combined with the better adhesion of the wall cake to the borehole wall, greatly reduces the volume of solids washed into the borehole by salt water flows. Moreover, those solids are largely in a more stable suspension, and do not settle from the liquid as readily as the larger particles of solids present when the drilling is with ordinary desanded muds. The lower friction resulting from the virtual absence of grit in the wall cake further reduces the danger of stuck drill pipe caused by salt water flows.

Regardless of the reason for the reduction in the stuck drill pipe, experiences on wells in southern Louisiana have shown that the low silt muds are effective in reducing the danger of stuck drill pipe under conditions which ordinarily result in stuck drill pipe.

EXAMPLE 1

In a well drilled in the West Delta area of southern Louisiana using a low silt drilling mud of this invention having a density of 10 pounds per gallon as a result of clay solids suspended in an emulsion of diesel oil and water, a salt water flow was encountered at a depth of 12,644 feet. The volume of drilling muds gained 54 barrels while the salt water flow was detected and the blowout preventers were closed. During a period of 12 hours during which the drill pipe was reciprocated in the hole, 11.7 pounds per gallon drilling mud was mixed and pumped down the drill pipe to kill the well. 780 barrels of clear salt water were circulated from the hole during this period. 30 joints of drill pipe were pulled from the hole whereupon the well started flowing. The kelly was installed and the blowout preventer closed. 12.2 pounds per gallon drilling mud was mixed and pumped into the hole. The blowout preventers were opened and mud was circulated in the hole for a period of five hours. Mud discharged from the hole was cut with salt water and gas. Circulation of mud was continued for a period of 3 hours while the density of the mud was raised to 12.5 pounds per gallon. Returns of the drilling mud were lost, after which the hole was filled with 56 barrels of salt water and the well was allowed to set for two hours. After setting for two hours, drilling mud was circulated in the well with full returns, and thereafter the drill pipe was pulled out of the hole with no drag on the drill pipe. Past experience with similar salt water flows and well treatment to combat the flows in that area had indicated that the drill pipe would almost invariably have stuck if conventional desanded drilling muds had been used in the drilling.

EXAMPLE 2

A well was drilled in the Vermilion area of southern Louisiana with a low silt oil-in-water emulsion mud having a weight of 9.7 pounds per gallon and containing 0 percent sand. A high pressure salt water flow was hit at 11,280 feet. The volume of the mud in the mud pits gained 60 barrels while detecting flow and closing blowout preventers. During a period of 6 hours, 20 barrels of 16 pounds per gallon drilling mud and 50 barrels of 13.2 pounds per gallon drilling mud were pumped into the drill pipe. The kelly and 9 joints of drill pipe were pulled from the hole. During a period of 2 hours, 12.2 pounds per gallon drilling mud was pumped into the drilling mud. The returns were cut with salt water and gas whereupon the well was closed in. The pipe in the well was free. Additional mud was mixed in the drilling pits and pumped into the drill pipe. All of the mud was circulated down the drill pipe and the returns were salt water. The blowout preventers were closed and the drill pipe was not worked for a period of four hours after which the pipe was worked and was free. 600 barrels of mud were mixed and pumped down the drill pipe to circulate out the salt water, after which the drill pipe was pulled from the hole. Experience with the normal desanded drilling muds containing normal amounts of silt has indicated stuck drill pipe would have been almost certain in a well subjected to the conditions described above.

An added advantage of the low silt drilling muds resulting from this invention is faster drilling rates which are of greatest advantage at depths exceeding 8,000 feet and particularly at depths greater than 10,000 feet. The necessity of a drilling mud of higher viscosity to allow removal of the cuttings at the greater depths, the harder formations encountered at increased depths and the higher pressures existing at the greater depths which make heavier drilling muds necessary, all contribute toward slowing down drilling rates at the greater depths. Comparison of drilling rates obtained with the low silt drilling muds of this invention with drilling rates obtained with conventional desanded drilling muds in close-by wells in the same fields has shown a uniform increase in drilling rates as a result of the use of the low silt drilling muds. The following table compares drilling rates obtained with the low silt drilling muds of this invention with drilling rates that have been obtained with drilling muds from which sand has been removed by conventional methods.

TABLE I

| Drilling Mud | Density, p.p.g. | Field | Average Drilling Rate, ft./hr. | | | |
|---|---|---|---|---|---|---|
| | | | At 8,000' | At 10,000' | At 11,500' | At 13,000' |
| Desanded | 10.0–11.6 | Timbalier Bay | 180 | 80 | 30 | 15 |
| Low Silt | 9.0–10.0 | ___do___ | 250 | 140 | 80 | 50 |
| Desanded | 10.0–10.6 | Vermilion | 130 | 85 | ¹ 40 | |
| Low Silt | 9.0–10.0 | ___do___ | 150 | 170 | ¹ 125 | |
| Desanded | | Timbalier Bay | 120 | 70 | ² 20 | |
| Low Silt | | ___do___ | 180 | 110 | ² 60 | |
| Desanded | 10.0–10.9 | ___do___ | 130 | 80 | 40 | 10 |
| Low Silt | 9.0–10.4 | ___do___ | 220 | 130 | 80 | 35 |
| Desanded | 10.0–10.6 | South Marsh | 100 | 65 | 40 | 20 |
| Low Silt | 9.0–10.0 | ___do___ | 185 | 125 | 85 | 60 |

¹ At 11,000'.
² At 12,200'.

A portion of the increase in the drilling rate resulting from the use of low silt drilling muds is probably caused by the lower density of those muds. However the differences in the densities of the low silt muds and the corresponding desanded muds used in the operations presented in Table I are slight while as much as threefold increases in drilling rates are obtained. Such a large increase in drilling rate would not be expected from merely decreasing the density of the drilling mud.

I claim:

1. A method of treating drilling mud containing clay solids used in a rotary process for drilling a well comprising passing all of the drilling mud returned from the well through means to remove cuttings and sand, circulating the desanded fluid through desilting means to remove substantially all sand and at least 85 percent of all solid particles having a particular size larger than 30 microns from the drilling mud to form a low silt drilling mud containing clay solids, and delivering only low silt drilling mud containing clay solids to the suction of a slush pump for circulating the drilling mud in the rotary drilling process.

2. A method of treating drilling mud containing clay solids used in a rotary process for drilling a well comprising passing all of the drilling mud returned from the well through means to remove cuttings and sand, circulating the desanded fluid through desilting means to remove substantially all sand and at least 90 percent of all solid particles having a particle size larger than 30 microns from the drilling mud to form a low silt drilling mud containing clay solids, and delivering only low silt drilling mud containing clay solids to the suction of a slush pump for circulating the drilling mud in the rotary drilling process.

3. A method of treating a drilling mud containing clay solids used in a rotary process for drilling a well comprising passing drilling mud returned from the well through means to remove cuttings and sand, circulating the desanded fluid through desilting means to remove at least 95 percent of particles in the drilling mud having a size larger than 30 microns while retaining clay solids in the drilling mud to form a low silt drilling mud, the rate of passing the drilling mud through the desilting means being 150 to 200 percent of the rate of circulating the drilling mud in the rotary drilling process, delivering only low silt drilling mud to the slush pump for circulation through the rotary drilling process, and recycling the excess of the drilling mud discharged from the desilting means over the drilling mud pumped by the slush pump through the desilting means.

4. A method of treating a drilling mud used in a rotary process for drilling a well in which the drilling mud is circulated through the well to remove cuttings therefrom, the cuttings are removed from the drilling mud, and the drilling mud is recirculated through the well, comprising removing sand particles having a particle size larger than approximately 200 mesh U.S. Sieve Series from all of the drilling mud discharged from the well and to be recirculated therethrough to form a desanded drilling mud, removing about 95 percent of particles having a size larger than 30 microns from the desanded drilling mud to form a low silt drilling mud containing clay solids, and pumping only low silt drilling mud into said well for circulation therethrough.

5. A rotary process for drilling a well in which a drilling mud containing clay solids is circulated through the well to remove cuttings therefrom, the cuttings are removed from the drilling mud, and the drilling mud is recirculated through the well, comprising delivering said drilling mud discharged from the well through a screen for removal of cuttings from said drilling mud, delivering drilling mud passing through the screen into a settling pit, pumping all of the drilling mud to be recirculated through the well from the settling pit through cyclone separators adapted to remove sand particles larger than approximately 200 mesh U.S. Sieve Series and form a desanded drilling mud to be treated for recirculation into the well and, delivering all of the desanded drilling mud containing clay solids suspended therein through cyclone separators adapted to remove about 95 percent of the silt particles having a size larger than 30 microns from the desanded drilling mud to form a low silt drilling mud, delivering the low silt drilling mud into a low silt drilling mud pit, and circulating low silt drilling mud directly from said low silt drilling mud pit through the well in the rotary drilling process.

6. A method of treating a drilling mud containing clay solids recirculated through a well in a rotary process for drilling a well comprising passing said drilling mud through desanders to remove solid particles larger than 200 mesh U.S. Sieve Series from the drilling mud, passing drilling mud from the desanders through desilters to remove at least about 90 percent of solid particles larger than 30 microns from the desanded drilling mud to form a low silt drilling mud, delivering the low silt drilling mud to the slush pump of the rotary drilling system for circulation through the well, the rate of passing desanded drilling mud through the desilters being 150 to 200 percent of the rate of circulation of the drilling mud through the well, and recirculating through the desilters the excess of flow through the desilters over the rate of circulation in the drilling process.

7. A method of treating a drilling mud containing clay solids used in a rotary process for drilling a well in which a slush pump recirculates drilling mud through the well comprising passing drilling mud returned from the well through desanders at a rate higher than the rate of circulation through the well to form a desanded drilling mud substantially devoid of particles larger than 200 mesh U.S. Sieve Series, recirculating through the desanders the excess over the rate of circulation through the well, passing desanded drilling mud through desilters adapted to retain clay solids in the drilling mud and remove at least about 90 percent of the particles larger than 30 microns in the drilling mud to form a low silt drilling mud, delivering only low silt drilling mud from the desilters to the suction of the slush pump for circulation through the well, said rate of flow through the desilters being 150 to 200 percent of the rate of circulation through the well, and recirculating through the desilters the excess in the flow through the desilters over the circulation through the well.

8. A method of drilling a well by a rotary drilling process in which drilling mud is circulated through a well to remove cuttings from the well, the cuttings are separated from drilling mud discharged from the well, and drilling mud is recirculated through the well, comprising passing drilling mud discharged from the well over a screen for removal of coarse cuttings therefrom, delivering drilling mud passing through the screen into a first settling pit, overflowing drilling mud from the first settling pit into a second settling pit, pumping all of the drilling mud to be recirculated through the well from the second settling pit through desanding apparatus adapted to remove sand particles larger than 200 mesh U.S. Sieve Series and delivering the thus desanded drilling mud into a desanded drilling mud pit, pumping the desanded drilling mud pit through desilting apparatus adapted to retain clay solids in the drilling mud and remove at least about 95 percent of solid particles larger than 30 microns from the desanded drilling mud to form a low silt drilling mud, delivering the low silt drilling mud into a low silt mud pit, delivering low silt drilling mud from the low silt drilling mud pit to a slush pump for circulating the low silt drilling mud through the well, the rate of flow of the desanded mud through the desilters being 150 to 200 percent of the rate of circulation of the low silt mud through the well, and overflowing low silt drilling mud from the low silt mud pit into the desanded mud pit.

9. A process as set forth in claim 8 in which the drilling mud is unweighted mud having a density of 8.5 to 10.5 pounds per gallon.

10. A process as set forth in claim 8 in which the drilling mud contains barite suspended therein to increase the density of the drilling mud, and said barite is discharged from the desilters with the low silt mud.

11. Apparatus for treating a drilling mud containing clay solids suspended therein for use in the rotary drilling of a well comprising means for delivering drilling mud returned from the well into a settling pit, a plurality of desanders connected in parallel, pumping means for passing drilling mud from the settling pit through the desanders and delivering drilling mud discharged from the desanders into a desanded mud pit, means for discarding sand from the system, a plurality of desilters connected in parallel, pumping means for passing drilling mud from the desanded mud pit through the desilters and delivering the desilted drilling mud into a desilted mud pit, means for discarding silt from the system, a slush pump for circulating the desilted mud from the desilted mud pit through the well, and a conduit directly from the desilted mud pit to the slush pump.

12. Apparatus as set forth in claim 11 in which the desanders are cyclone separators constructed and arranged to remove substantially all particles larger than 200 mesh U.S. Sieve Series from the drilling mud, and the desilters are cyclone separators constructed and arranged to remove at least about 85 percent of the particles larger than 30 microns from the drilling mud and retain clay solids in the drilling mud.

13. Apparatus as set forth in claim 11 in which 4 to 10 desanders are connected in parallel and about 20 to 60 desilters are connected in parallel.

14. A rotary process for drilling a well in which a drilling mud containing clay solids is circulated through the well to remove cuttings therefrom, the cuttings are removed from the drilling mud, and the drilling mud is recirculated through the well, comprising delivering said drilling mud discharged from the well through a screen for removal of cuttings from said drilling mud, delivering drilling mud passing through the screen into a settling pit, pumping the drilling mud from the settling pit, at a rate higher than the mud circulation rate through the well, through cyclone separators adapted to remove said particles larger than approximately 200 mesh U.S. Sieve Series and form a desanded drilling mud with the excess of the flow through desanding cyclone separators over the rate of circulation through the well recirculated through desanding cyclone separators, delivering all of the desanded drilling mud containing clay solids suspended therein through desilting means adapted to remove about 95 percent of the silt particles having a size larger than 30 microns from the desanded drilling mud to form a low silt drilling mud, delivering the low silt drilling mud into a low silt driling mud pit, and circulating only low silt drilling mud from said low silt drilling mud pit through the well in the rotary drilling process and recycling any excess of drilling mud discharged from the desilting means over the drilling mud pumped by the slush pump through the desilting means.

15. A method of treating drilling mud containing clay solids used in a rotary process for drilling a well comprising passing all of the drilling mud returned from the well through means to remove substantially all sand and at least 85 percent of all solid particles having a particle size larger than 30 microns from the drilling mud to form a low silt drilling mud containing clay solids in which the median cut of solid particles is 10 to 20 microns and delivering only a low silt drilling mud containing clay solids in which the median cut of solid particles is 10 to 20 microns to the suction of a slush pump for circulating the drilling mud in the rotary drilling process.

References Cited by the Examiner

UNITED STATES PATENTS

| | | | |
|---|---|---|---|
| 2,435,211 | 2/1948 | Gillet | 252—8.5 |
| 2,555,265 | 5/1951 | Bergman | 252—8.5 |
| 2,870,990 | 1/1959 | Bergey | 175—66 |
| 2,919,898 | 1/1960 | Marwil | 175—66 |
| 2,941,783 | 6/1960 | Stinson | 175—206 |
| 2,954,871 | 10/1960 | Lummus | 209—211 |

FRANK W. LUTTER, *Primary Examiner.*